United States Patent
Hammadi et al.

(10) Patent No.: US 11,584,335 B2
(45) Date of Patent: Feb. 21, 2023

(54) MOVABLE BELT-ANCHORAGE SYSTEM

(71) Applicant: FAURECIA Sièges d'Automobile, Nanterre (FR)

(72) Inventors: Semir Hammadi, Saulx les Chartreux (FR); Fabrice Camus, Paray Vieille Poste (FR); Roland Faure, Etampes (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 0 days.

(21) Appl. No.: 17/377,904

(22) Filed: Jul. 16, 2021

(65) Prior Publication Data
US 2022/0017039 A1    Jan. 20, 2022

(30) Foreign Application Priority Data
Jul. 17, 2020   (FR) .................................... 2007525

(51) Int. Cl.
*B60R 22/26*   (2006.01)
*B60R 22/20*   (2006.01)

(52) U.S. Cl.
CPC .............. *B60R 22/26* (2013.01); *B60R 22/20* (2013.01)

(58) Field of Classification Search
CPC . B60R 22/20; B60R 22/201; B60R 2022/207; B60R 2022/208
See application file for complete search history.

(56) References Cited

U.S. PATENT DOCUMENTS

| | | | | |
|---|---|---|---|---|
| 10,065,531 | B2* | 9/2018 | Ferre | B60N 2/0818 |
| 10,081,330 | B2* | 9/2018 | Arnold | B60R 22/203 |
| 10,857,912 | B2* | 12/2020 | Rey | B60N 2/067 |
| 2015/0307060 | A1* | 10/2015 | Arnold | B60R 22/26 |
| | | | | 297/469 |
| 2018/0056931 | A1* | 3/2018 | Tsujimoto | B60R 22/03 |

FOREIGN PATENT DOCUMENTS

| | | | | |
|---|---|---|---|---|
| JP | 2015033860 A | | 2/2015 | |
| WO | 2014093266 A1 | | 6/2014 | |
| WO | WO-2014093266 A1 * | | 6/2014 | ............. B60N 2/688 |
| WO | WO-2018157016 A1 * | | 8/2018 | |
| WO | WO-2018167945 A1 * | | 9/2018 | ........... B60N 2/0232 |

OTHER PUBLICATIONS

French Preliminary Search Report for French App. No. FR2007525 dated Nov. 26, 2020, 8 pages, No English Translation Available.

* cited by examiner

*Primary Examiner* — Barry Gooden, Jr.
(74) *Attorney, Agent, or Firm* — Barnes & Thornburg LLP

(57) ABSTRACT

A movable anchorage system for a seat belt, having a lockable slide mechanism comprising a slide extending in a longitudinal direction of adjustment, a slider system comprising at least one body configured to move in translation along the slide while being guided by the slide, the body incorporating an anchorage device for the seat belt, an actuator configured to ensure the movement of the slider system along the slide, a mechanism for locking the position of the slider system in the slide.

20 Claims, 10 Drawing Sheets

MOVABLE BELT-ANCHORAGE SYSTEM

PRIORITY CLAIM

This application claims priority to French Application No. FR2007525, filed Jul. 17, 2020, which is expressly incorporated by reference herein.

BACKGROUND

The present disclosure relates to a movable anchorage system for a seat belt, as well as a vehicle seat equipped with such an anchorage system.

SUMMARY

According to the present disclosure, a movable anchorage system for a seat belt, includes a lockable slide mechanism including a slide extending in a longitudinal direction of adjustment of the position of the anchorage device for the seat belt, a slider system comprising at least one body configured to move in translation along the slide while being guided by the slide, the body incorporating an anchorage device for the seat belt, an actuator configured to ensure the movement of the slider system along the slide, comprising an electric motor and a screw/nut system including a screw, extending in the longitudinal direction of the slide, driven in rotation by the electric motor, and a nut configured to drive the slider system when caused to move by the screw during its rotation, a mechanism for locking the position of the slider system in the slide, comprising:

a first set of teeth integral with the slide, extending in the longitudinal direction of the slide, a second set of teeth integral with a locking member of the slider system, the locking member configured to be movable relative to the body of the slider system from a locking position in which the second set of teeth is engaged with the first set of teeth, locking the movement of the slider system in the slide, and to an unlocked position in which the second set of teeth escapes the first set of teeth, freeing the slider system to slide in the slide, and a cam/cam follower system between the locking member and the nut, configured, when the nut is moved along the slide in a limited stroke, to move the locking member relative to the body from the locking position to the unlocked position by the work performed by the cam follower along the cam, before driving the body of the slider system integral with the anchorage device.

In illustrative embodiments, the cam comprises, from a neutral position of the cam follower relative to the cam allowing the passage of the locking member into the locking position, at least one ramp configured to cooperate with the cam follower in order to force the locking member into the unlocked position when the nut is actuated by the screw and electric motor in at least one direction of movement along the slide.

For example, the at least one ramp comprises a first ramp and a second ramp. Thus, and according to one embodiment, the cam comprises, along the longitudinal direction of the slide, one on either side of the neutral position of the cam follower with respect to the cam allowing the locking member to enter the locking position:

the first ramp extending from the neutral position, configured to cooperate with the cam follower to force the locking member into the unlocked position when the nut is actuated by the screw and electric motor in a first direction of movement along the slide, the second ramp extending from the neutral position, configured to cooperate with the cam follower to force the locking member into the unlocked position when the nut is actuated by the screw and electric motor in a second direction of movement.

In illustrative embodiments, an elastic member is provided between the locking member and the body of the slider system, elastically forcing the locking member from the unlocked position to the locking position.

In illustrative embodiments, the cam/cam follower system is configured, in the unlocked position of the locking member, to break in the event of a force between the cam and cam follower that exceeds a threshold, resulting from the action of the anchorage device during an impact, so as to ensure the passage of the locking member into its locking position after breakage of the cam/cam follower system. The threshold may preferably be between about 200 N and about 400 N, for example about 300 N (Newtons).

In illustrative embodiments, the slide is a section piece extending in the longitudinal direction, the cross-section of the section piece having an intermediate wing extended by two curved wings, upper and lower, directed towards one another, and the slider system is received in the cavity of the section piece, in the interspace between the two curved wings.

In illustrative embodiments, the body has at least two upwardly projecting protuberances, spaced apart from one another in the longitudinal direction of the slide, coming into a cavity formed by the upper curved wing, and configured to bear directly or indirectly on the lower face of the upper curved wing under the action of the anchorage device fixed to the body, during an impact.

In illustrative embodiments, the first set of teeth on the section piece is made, along the longitudinal direction of the slide, at the end of the upper curved wing.

In illustrative embodiments, the body comprises a groove, for example oriented transversely to the slide, in particular perpendicular to the longitudinal direction, receiving the locking member in the sliding clearance and configured to guide the locking member in its translational movement from the locking position to the unlocked position, and vice versa.

In illustrative embodiments, the locking member is held in the groove of the body by a cover element coming to cover the groove, the cover element being in particular clipped onto the body.

In illustrative embodiments, the cover element comprises an upper groove directed in the longitudinal direction of the slide, receiving the free end of the upper curved wing, and/or a lower groove directed in the longitudinal direction of the slide, receiving the free end of the lower curved wing.

In illustrative embodiments, the locking member comprises an oblong hole oriented in the direction of the groove, traversed by a tubular attachment part projecting from the bottom of the groove, and to which the anchorage device for the seat belt is fixed.

In illustrative embodiments, the cover element comprises two tabs covering the two projecting protuberances of the body, the protuberances being configured to bear, indirectly, against the lower face of the upper curved wing under the action of the anchorage device fixed to the body, during an impact, the two tabs then clamped between the lower face of the upper curved wing and the two protuberances under the action of the anchorage device during an impact.

In illustrative embodiments, the elastic member is a helical torsion spring in which the turns surround the tubular attachment part.

In illustrative embodiments, the body of the slider system comprises two downwardly directed projecting parts, staggered along the longitudinal direction of the slide, having coaxial bores for the passage of the screw, the two projecting parts leaving a clearance between them for the nut, of excess dimension compared to the dimension of the nut along the axis of the screw, enabling movement of the nut relative to the body along the limited stroke, in one direction or in the other, to allow the passage of the locking member from the locking position to the unlocked position, and in which the nut is prevented from pivoting about the axis of the screw during this movement caused by rotation of the screw, due to a surface of the body, which cooperates with a flat part of the nut.

In illustrative embodiments, the cam follower is a projecting stud integral with the nut, the cam being integral with the locking member.

In illustrative embodiments, the anchorage device for the seat belt incorporates a preloading device comprising a trigger device configured to detect an impact, and an actuator such as a spring, a gas cartridge, or an explosive device, controlled by the trigger device, configured to force an anchorage point of the belt along a limited stroke.

In illustrative embodiments, a vehicle seat comprises a seating portion with:

a seating portion assembly, having a front edge and a rear edge, comprising a seating portion frame and an anchorage frame for anchoring to the vehicle, which are interconnected, two anchorage devices for the seat belt, the two anchorage devices arranged one on either side of the seating portion assembly, configured to anchor the lap portion of the seat belt strap to a seating portion assembly, a seat belt strap comprising a lap portion connected to the seating portion by means of each of the two anchorage devices, a seat backrest hinged to pivot about a substantially transverse axis of the seating portion, at the rear edge of the seating portion assembly, and wherein each anchorage device for the seat belt is mounted to be movable relative to the seating portion assembly, by means of a movable anchorage system for seat belt according to this disclosure in which the slide is laterally attached to the seating portion frame, the movable anchorage systems being configured so that each of the anchorage devices is able to be moved along the seating portion assembly between the rear edge and the front edge of the seating portion assembly, with the position of the anchorage device being locked by the passage of the locking member into the locking position at the end of the movement.

In illustrative embodiments, the seat comprises control means for controlling the actuators of the two movable anchorage systems for seat belt, configured to cause the sliding of each of the two anchorage devices along the seating portion assembly automatically, the control means being configured to move each anchorage device, incorporated in the body of the slider system, along the slide according to a change in the tilt of the backrest relative to the seating portion and/or a change in the tilt of the seating portion, and the control means are configured so that the pivoting of the backrest relative to the seating portion towards the rear of the seat causes, after the passage of the locking member into the unlocked position, movement of the anchorage devices along the seating portion assembly towards the front of the seat to a defined position, then the locking of the position by the passage of the locking member into the locking position.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a view of a seating portion assembly, including the anchorage frame and the seating portion frame, the seating portion assembly provided with two movable anchorage systems according to this disclosure, in which the slides are respectively secured to two flanges of the seating portion frame, the two movable anchorage systems enabling adjustment of the position of two anchorage devices, each with a preloading device (also called a pretensioner); the two anchorage devices being intended to ensure the anchorage of the lap portion of the seat belt strap on both sides of the seating portion assembly;

Figure 1:
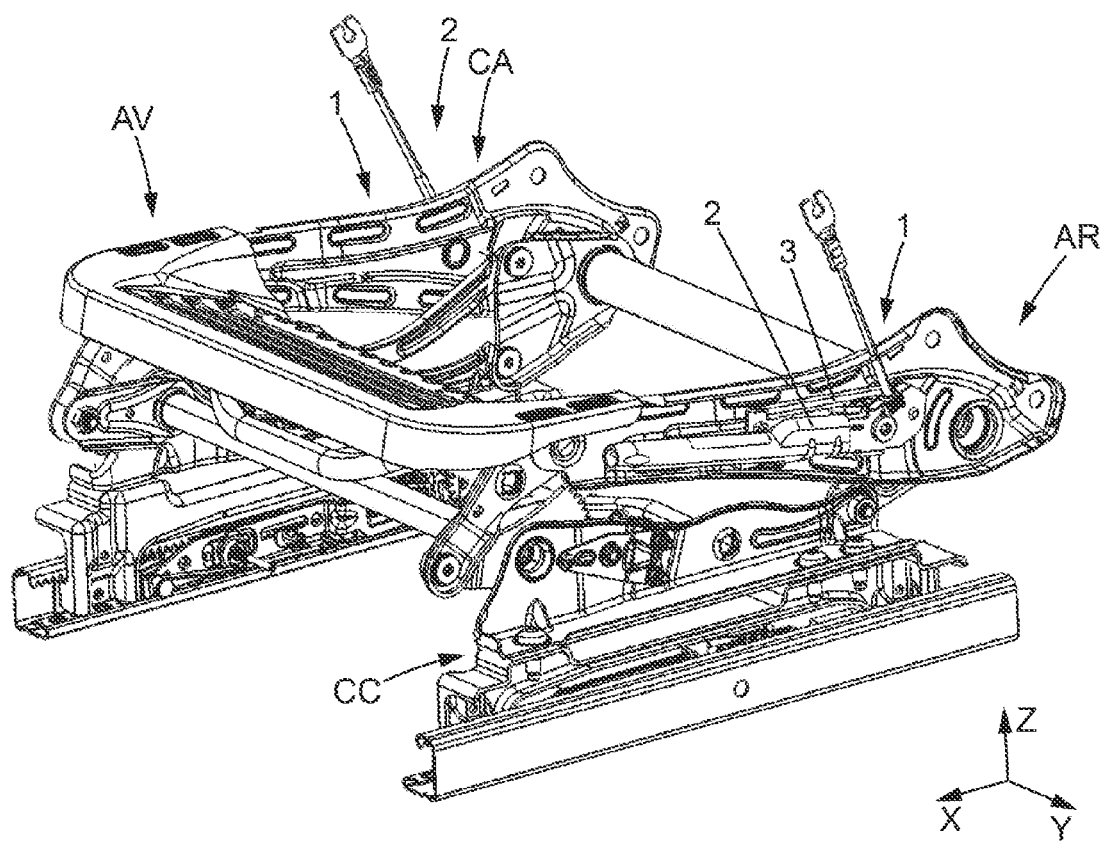
Figure 4:
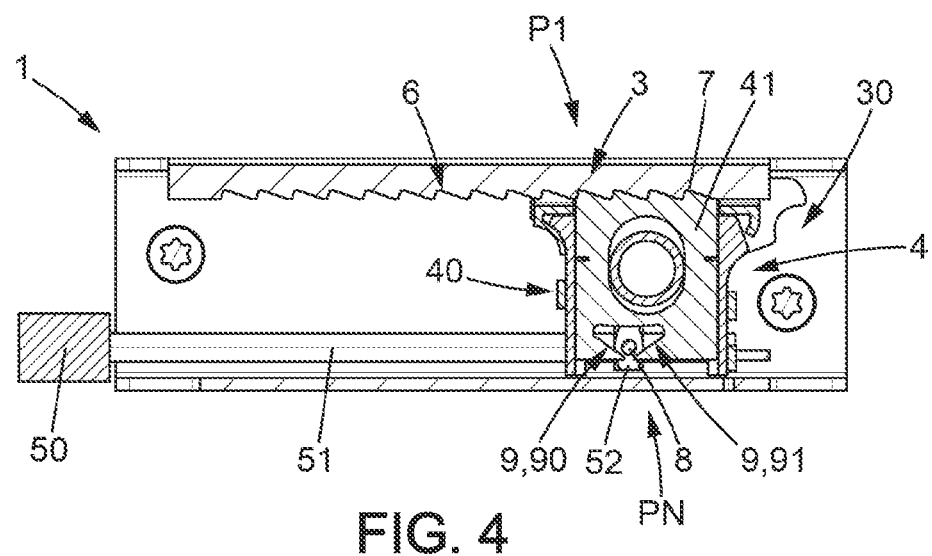
FIG. 4 is a sectional view according to FIG. 2, the locking member in the locking position in a neutral position of the cam follower relative to the cam.
Figure 5:
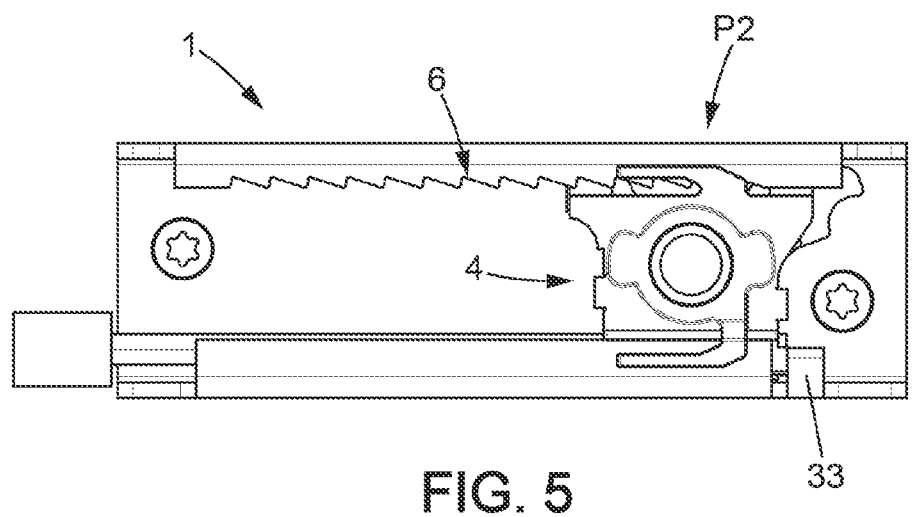
FIG. 5 is a front view of the movable anchorage system, in the unlocked position.
Figure 6:
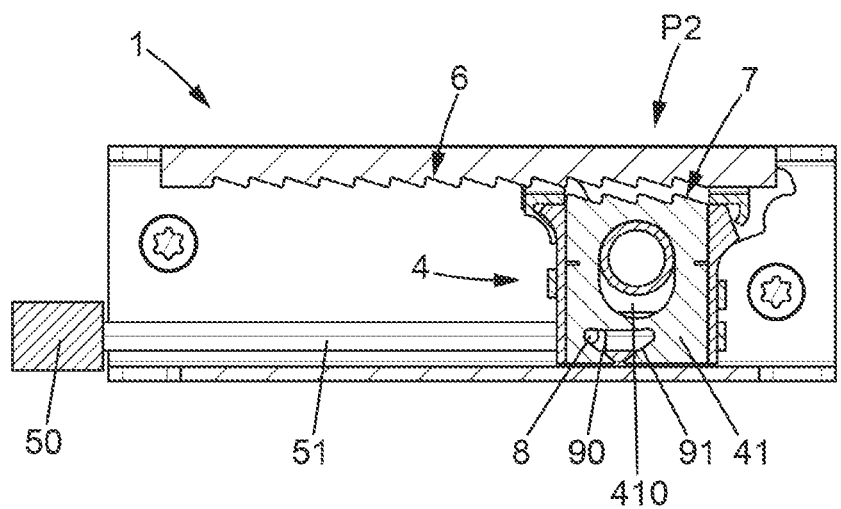
Figure 7:
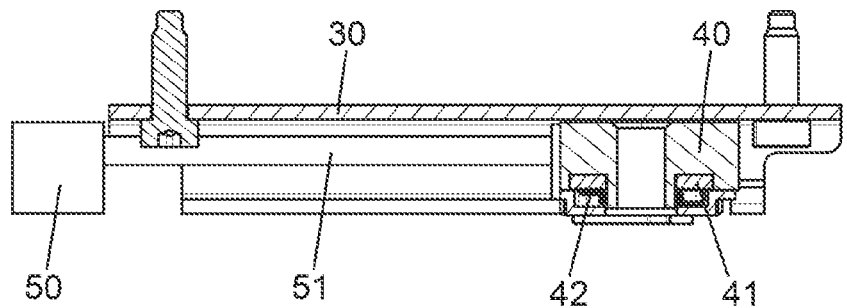
Figure 8:
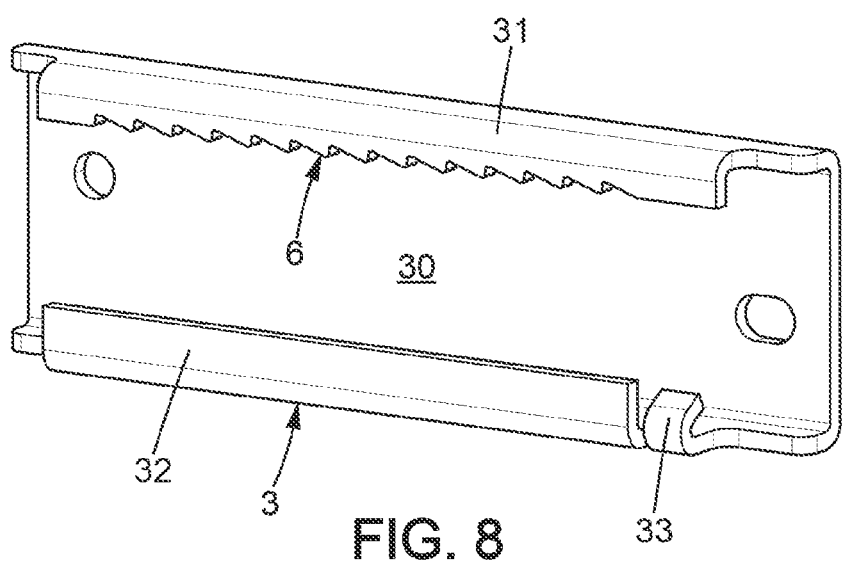
Figure 9:
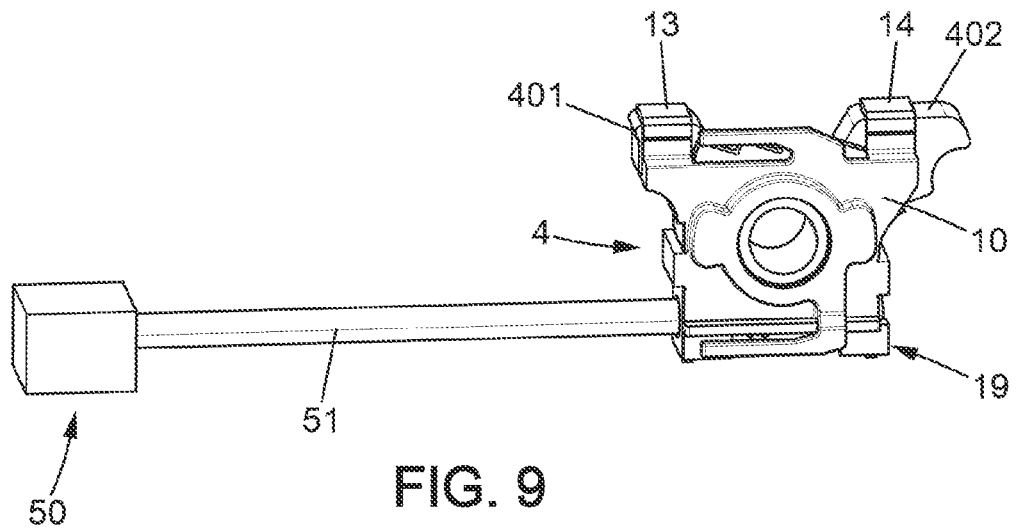
Figure 10:
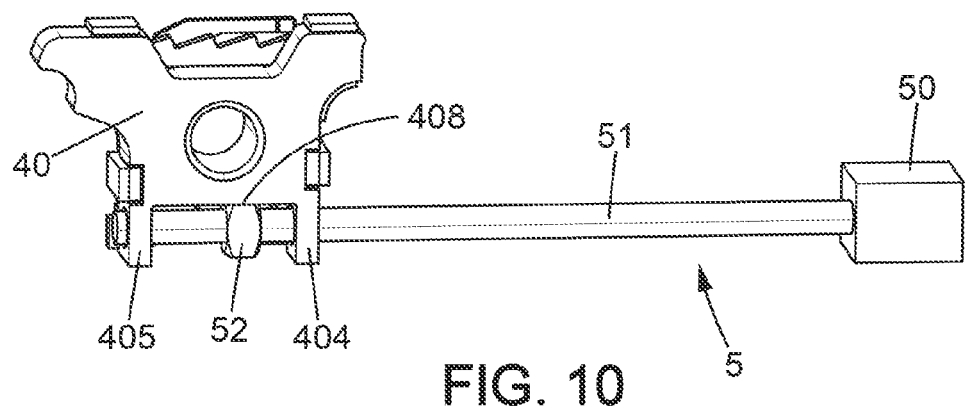
Figure 11:
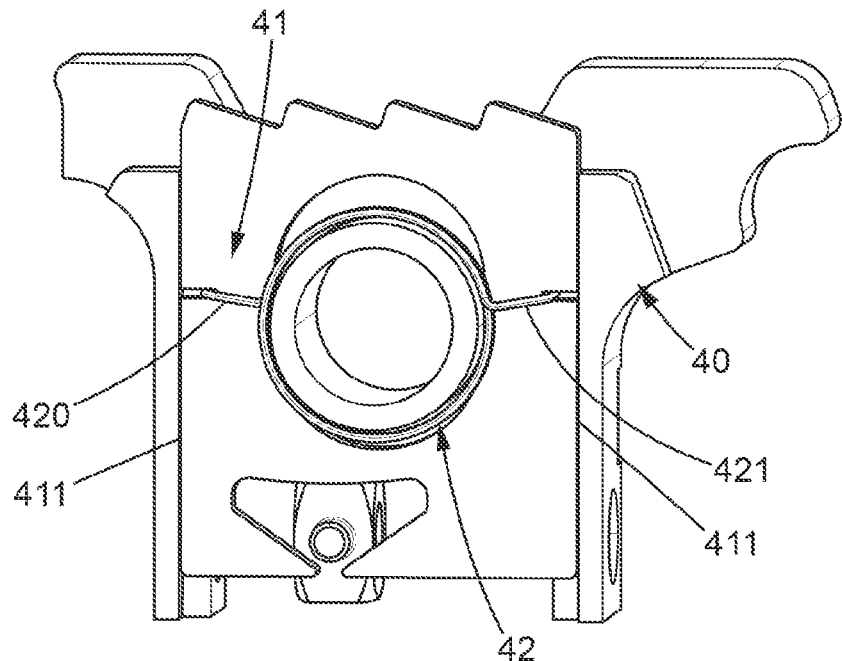
Figure 12:
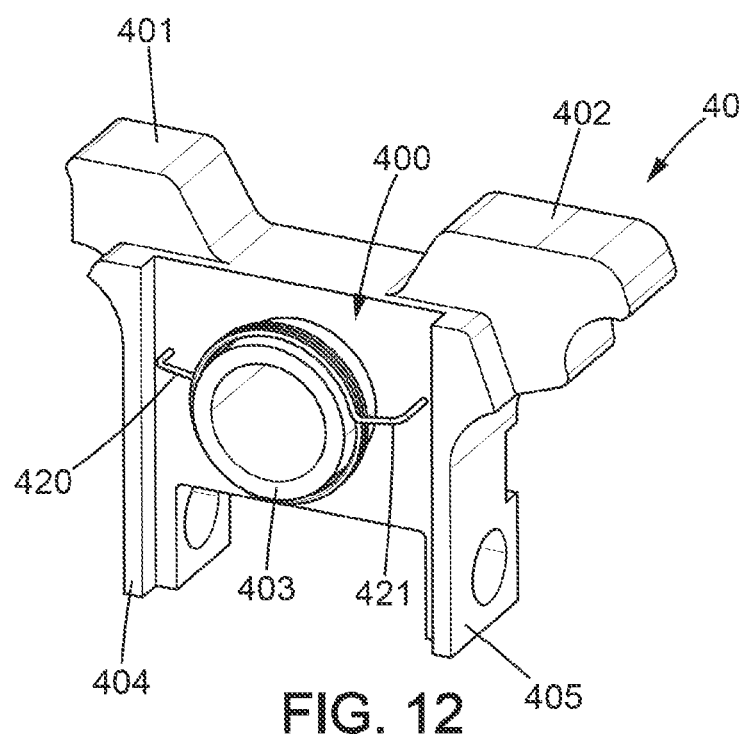
Figure 13:
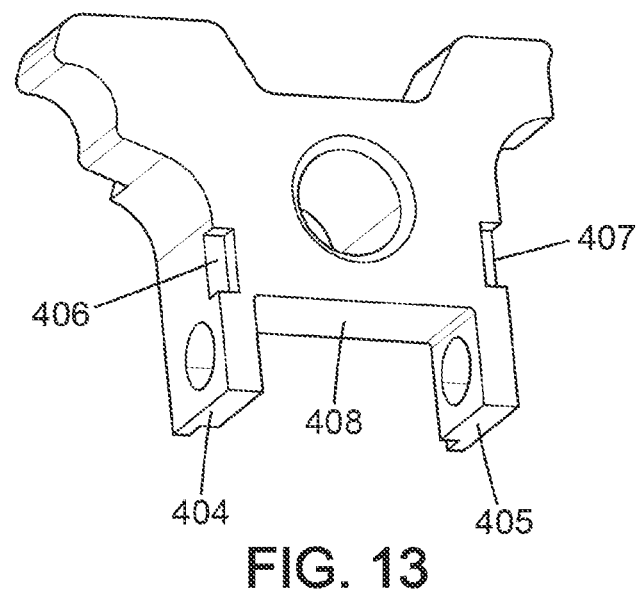
Figure 14:
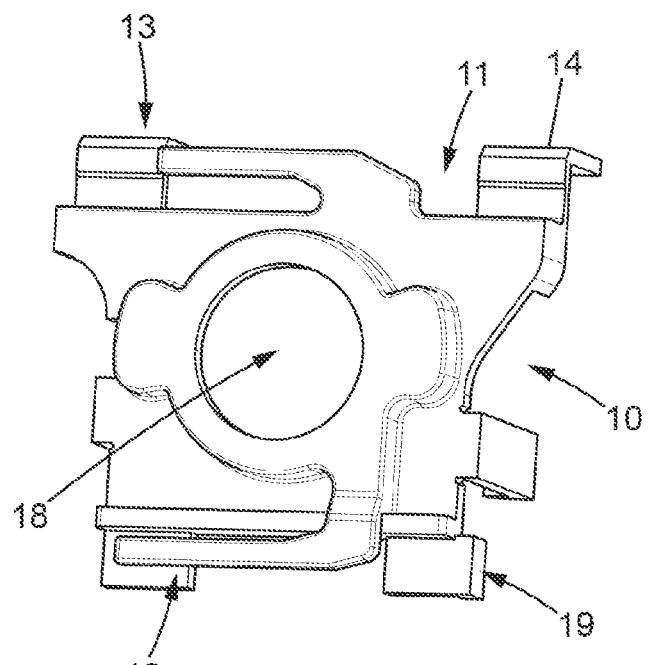
Figure 15:
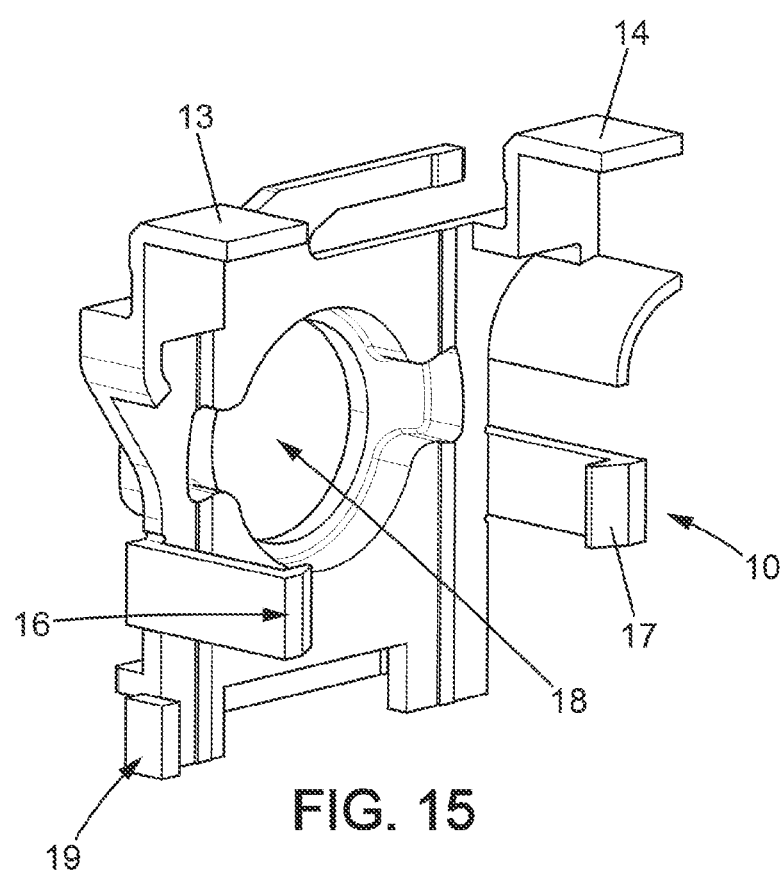
Figure 16:
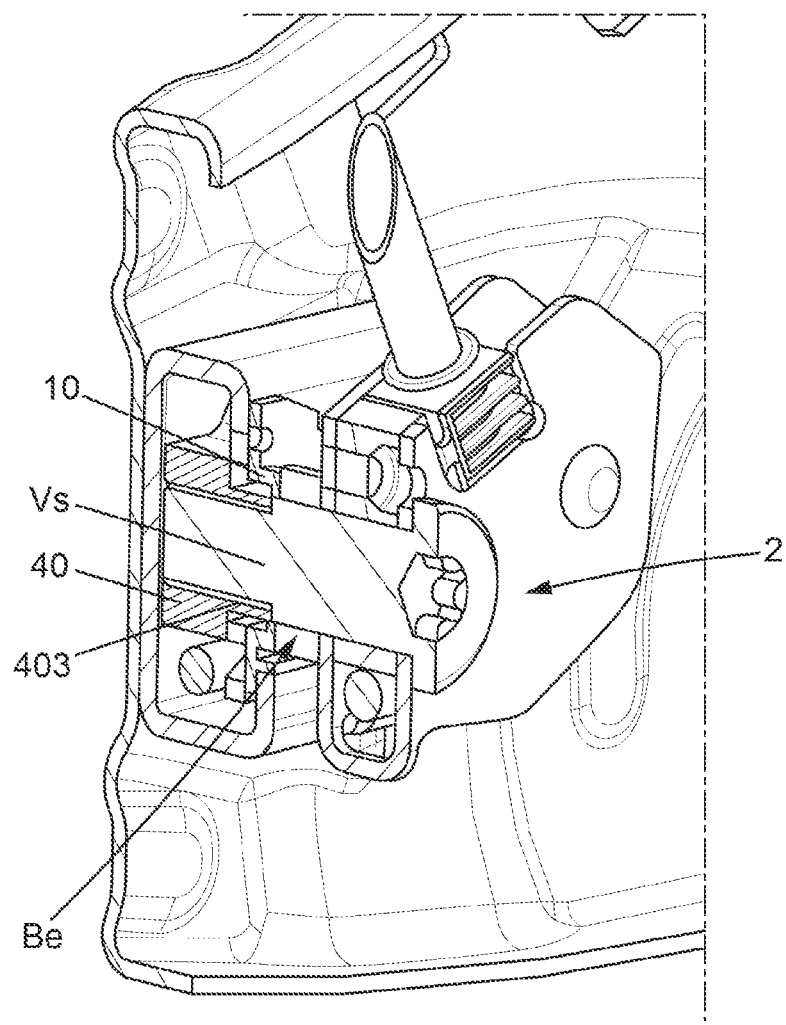

FIG. 6 is a sectional view of the system according to FIG. 5, illustrating, relative to FIG. 4, the leftward movement of the nut, the nut carrying a stud acting as a cam follower and which cooperates with a first ramp of the cam to move the locking member downward, into the unlocked position, and to a stop abutment at the end of the ramp allowing the cam follower to move the body of the slider system when the nut continues its movement in this direction;

FIG. 7 is a sectional view along a plane parallel to the longitudinal axis of the slide and perpendicular to the sliding axis of the locking member in the body of the slider system, more particularly illustrating the guiding of the locking member in a groove of the body, and the retention of the locking member provided by the cover element clipped to the body;

FIG. 8 is a detail view of the slide of a movable anchorage system according to FIG. 1;

FIG. 9 is a detail and front view of the slider system received in and guided by the slide, as well as the actuator, including the electric motor and the screw/nut system, partially received in the slide;

FIG. 10 is a rear view of the slider system and actuator as illustrated in FIG. 9;

FIG. 11 is a detail view of the slider system, as well as part of the nut and cam follower, when the cover element is removed;

FIG. 12 is a detail view of the slider system, when the cover element and the locking member are removed;

FIG. 13 is a rear view of the body of the slider system;

FIG. 14 is a detail and front view of the cover element intended to be clipped onto the body of the slider system;

FIG. 15 is a detail and back view of the cover element intended to be clipped onto the body of the slider system; and FIG. 16 is a sectional view illustrating the attachment between the anchorage device for the seat belt and the body of the slider, by a screw passing through and screwed into the tubular portion of the attachment body, traversing the opening of the cover element as well as an opening of the anchorage device, including the presence of a spacer traversed by the screw, the spacer resting on the anchorage device on the one hand and on the cover element on the other hand.

DETAILED DESCRIPTION

This disclosure relates to a movable anchorage system 1 for a seat belt, having a lockable slide mechanism comprising a slide 3 extending in a longitudinal direction of adjustment of the position of the anchorage device for the seat belt, a slider system 4 comprising at least one body 40 configured to move in translation along the slide 3 while being guided by the slide 3, the body incorporating an anchorage device 2 for the seat belt, and an actuator 5 configured to ensure the movement of the slider system along the slide 3.

This actuator 5 comprises an electric motor 50 and a screw/nut system including a screw 51, extending along the longitudinal direction of the slide 3, driven to rotate by the electric motor 50, and a nut 52 configured to drive the slider system 4 when caused to move by the screw 51 during its rotation. To do this, rotation of the nut 52 around the axis of the screw is blocked.

The movable anchorage system notably further comprises a mechanism for locking the position of the slider system in the slide, comprising: a first set of teeth 6 integral with the slide 3, extending in the longitudinal direction of the slide, a second set of teeth 7 integral with a locking member 41 of the slider system 4, the locking member 41 being movable relative to the body 40 of the slider system 4 from a locking position P1 in which the second set of teeth 7 is engaged with the first set of teeth 6, locking the movement of the slider system 4 in the slide 3, and to an unlocked position P2 in which the second set of teeth 7 escapes the first set of teeth 6, freeing the slider system 4 to slide in the slide 3.

The mechanism for locking the position of the slider system in the slide further comprises a cam 9/cam follower 8 system between the locking member 41 and the nut 52, configured, when the nut 52 is moved in a limited stroke along the slide 3, to move the locking member 41 relative to the body 40 from the locking position P1 to the unlocked position P2 by means of the work performed by the cam follower 8 along the cam 9, before driving the body 40 of the slider system which incorporates the anchorage device 2 along the slide 3.

According to one embodiment, an elastic member 42 is provided between the locking member 41 and the body 40 of the slider system 4 and elastically forces the locking member 41 from the unlocked position P2 to the locking position P1. The elastic member 42 may be a spring, such as a coil spring or a leaf spring.

According to one embodiment illustrated as an example in the figures, the cam follower 8 is a projecting stud integral with the nut 52, the cam being integral with the locking member 41. Alternatively, according to one embodiment not shown, the cam may be integral with the nut and the cam follower integral with the locking member.

For example, the cam 9 comprises, from a neutral position $P_N$ of the cam follower 8 relative to the cam 9 allowing the passage of the locking member 41 into the locking position P1, at least one ramp configured to cooperate with the cam follower 8 in order to force the locking member 41 into the unlocked position P2 when the nut 52 is actuated by the screw and electric motor in at least one direction of movement along the slide 3. The at least one ramp may consist of a first ramp 90 and a second ramp 91.

Thus, according to one embodiment, the cam 9 comprises, along the longitudinal direction of the slide, one on either side of the neutral position $P_N$ of the cam follower 8 with respect to the cam 9 allowing passage of the locking member 41 into the locking position P1: the first ramp 90 extending from the neutral position, configured to cooperate with the cam follower 8 to force the locking member 41 into the unlocked position P2 when the nut 52 is actuated by the screw and electric motor in a first direction of movement along the slide 3 along the limited stroke, the second ramp 91 extending from the neutral position, configured to cooperate with the cam follower 8 to force the locking member 41 into the unlocked position P2 when the nut 52 is actuated by the screw and electric motor in a second direction of movement along the limited stroke.

The figures illustrate such an embodiment when the cam follower 8 is a stud projecting from the nut 52. This stud projects laterally from the nut 52 in a direction perpendicular to the longitudinal direction of the slide 3, and is configured to cooperate with the cam, in particular the first ramp 90 and the second ramp 91 which are integral with the locking member 41, according to the direction of movement.

FIG. 4 illustrates the relative position of the cam follower 8, in this case the stud, relative to the cam 9, in this case comprising the first ramp 90 and second ramp 91 in the neutral position $P_N$ allowing the passage of the locking member 41 into the locking position P1.

In particular, and in this neutral position $P_N$, the cam follower 8 is in an intermediate position between the two ramps—first ramp 90 and second ramp 91—: The locking member 41 is free to move to the locking position P1 in which the teeth—first set of teeth 6 and second set of teeth 7—are engaged, in particular under the action of the elastic member 42.

The movement of the anchorage device in a first direction (to the left) and then its locking is obtained as described below. FIG. 6 is a sectional view, illustrating the work performed by the cam 9 and cam follower 8 when the nut 52 is driven leftward along the limited stroke. The cam follower 8, in this case the stud, cooperates with the first ramp 90 to move the locking member 40 to its unlocked position P2, in particular against the return force of the elastic member 42. Once in the unlocked position P2, the continued movement of the nut 52 in the same direction makes it possible to move the body 40 of the slider system 4 along the slide 4, in particular when the stud comes to abut against the end of the first ramp 90, and as illustrated in FIG. 6.

The body 40 of the slider system 4, including the anchorage device 2, can be moved to a desired position by moving the nut 52 leftward via the electric motor 50. The locking of the slider system in the slide is then obtained by a defined movement of the nut along the limited stroke, in the opposite direction (rightward) so as to replace the cam follower, in particular the lug, in its neutral position, by descending the first ramp 90. The elastic member 42 then again forces the locking member 41 into its locking position P1 in which the teeth—first set of teeth 6 and second set of teeth 7—are engaged.

Similarly, the movement of the anchorage device in a second direction (rightward) and then its locking is obtained as described below. The second ramp 91 allows the cam follower 8, in this case the stud protruding from the nut 52, to unlock the locking member 41 when the nut 52 is driven in the opposite direction, namely rightward along the limited stroke. The cam follower 8, in this case the stud, cooperates with the second ramp 91 so as to move the locking member 40 to its unlocked position P2, in particular against the return force of the elastic member 42. Once in the unlocked position P2, the continued movement of the nut 52 in the same direction (rightward) makes it possible to move the body 40 of the slider system 4 along the slide 4, in particular when the stud comes to abut against the end of the second ramp 91.

The body 40 of the slider system 4, including the anchorage device 2, can be moved to a desired position by moving the nut 52 rightward via the electric motor 50. The locking of the slider system is then obtained by a defined movement of the nut along the limited stroke (leftward) in the opposite direction so as to return the cam follower, in particular the lug, into its neutral position, by descending the second ramp 91. The elastic member 42 then again forces the locking member 41 into its locking position P1 for which the teeth—first set of teeth 6 and second set of teeth 7—are engaged.

The movable anchorage system 1 has a particular application in adjusting the position of the anchorage device(s) 2 ensuring the anchorage of the lap portion of the seat belt strap, according to the adjustment of position enabled by the slider system sliding in the slide.

For this purpose, the position of the slider system 4 and of the anchorage device 2 incorporated in the system is adjusted so that the lap portion of the seat belt is always positioned near the pelvis of the occupant, and ideally at the pelvic bones, regardless of the tilt adjustment of the seat and/or of the tilt adjustment of the backrest.

Figure 2:
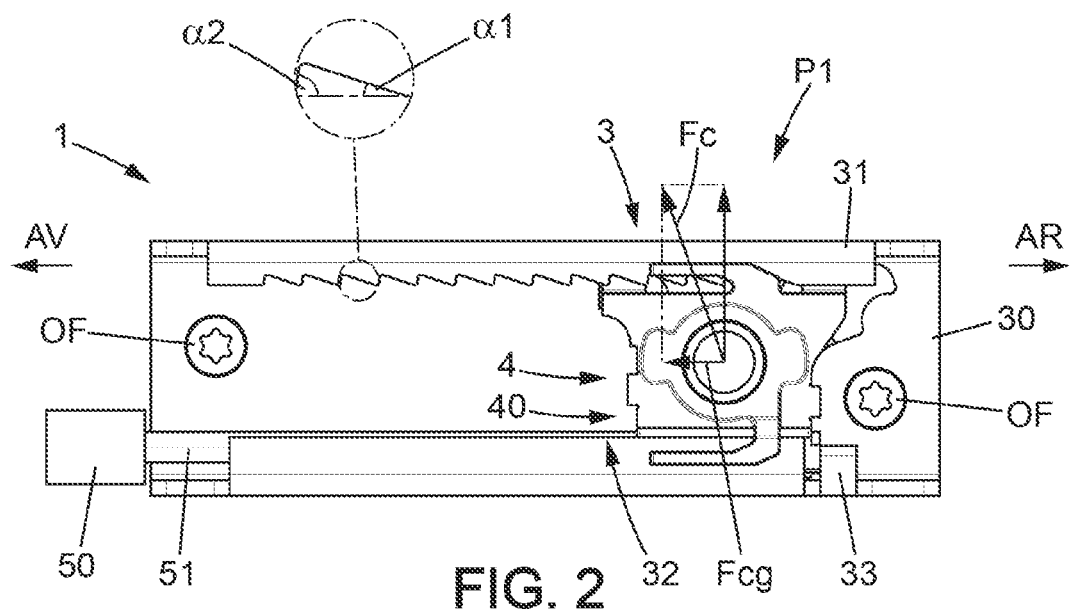
FIG. 2 is a front view of a movable anchorage system, more illustrating particularly the slide and the slider system in the locking position of the locking member (the anchorage device with its pretensioner removed)

Once the locking member 41 is in its locking position P1, the position of the body 40 of the slider system 4 and of the incorporated anchorage device 2 is advantageously locked in the longitudinal direction of the slide 3, in particular during a force Fc due to the traction of the seat belt strap on the anchorage device in the event of an impact, and as illustrated in FIG. 2

Such locking allows the force Fc to be taken up with no sliding of the anchorage device 5 incorporated in the body 40 of the slider system 4 for sliding along the slide 3. Advantageously, the ideal adjustment position of the lap portion of the seat belt strap is maintained in the event of an impact, which increases safety.

The slider body may be immediately locked by the teeth—first set of teeth 6 and second set of teeth 7—in the event of an impact, even during a phase of adjusting the position of the anchorage device. Thus, according to one advantageous embodiment, the cam/cam follower system is configured, in the unlocked position P2 of the locking member 41, to break in the event of a force greater than a threshold between the cam 9 and the cam follower 8 resulting from the action of the anchorage device during an impact. The passage of the locking member into its locking position P1 after breakage of the cam/cam follower system is ensured in particular by the work performed by the elastic member 42 which immediately forces the teeth, first set of teeth 6 and second set of teeth 7, to engage.

Such an arrangement advantageously makes it possible to lock the slider system 4 in the slide 3 in the event of an impact, even during a position adjustment phase in which the locking member 41 is in its unlocked position P2.

In the event of an impact, the force Fc on the anchorage device 2 comprises, along the longitudinal direction of the slide 3, a component Fcg, typically towards the front of the seating portion, generating shear between the cam 9 and the cam follower 8, which when greater than a defined threshold causes breakage of the cam/cam follower. For example, the cam follower, in the current case the stud, can be of a material (and/or of dimensions) enabling it to break when the threshold is exceeded. The stud may further comprise a breakage weak point such as a groove reducing its cross-section. The threshold can typically be between 200 N and 400 N, for example 300 N (Newtons).

Following the breakage of the cam/cam follower, the elastic member 42 immediately forces the locking member into its locking position P1, in order to quickly lock the position and thus minimize the movement of the anchorage device by sliding of the slider body 4 along the slide 3.

According to one embodiment, the slide 3 may be a section piece extending in the longitudinal direction, typically made of metal. The cross-section of this section piece has an intermediate wing 30 extended by two curved wings 31, 32, upper and lower, directed towards one another. The intermediate wing 30 may be flat and form an attachment plate along the length of the slide. This attachment plate is intended to be fixed to the seating portion frame CA, and in particular to a flange of the seating portion frame as illustrated in FIG. 1.

This attachment plate may comprise openings, for example two in number, for attachment members OF, in particular attachment screws. The slider system 4 is received in the cavity of the section piece, in the interspace between the two curved wings 31,32.

The body 40 of the slider system extends between the two curved wings 31,32, in the direction transverse to the slide 3, such that its upper part (in particular two upwardly directed protuberances 401, 402) is received in the cavity of the upper curved wing 31, and that its lower part (in particular two downwardly directed projecting parts 404, 405) are in the cavity of the lower 32 curved wing 32.

In other words, the dimension of the body 40 in the transverse direction between the two curved wings 31, 32 is greater than the dimension of the opening between the edges of the curved wings 31, 32, preventing its passage via this opening. When mounting the movable anchorage system, the body 40 is therefore inserted into the section piece of the slide 3 through one of the two mouths of the slide, at one of the two longitudinal ends of the slide 3.

According to one embodiment, the body 40 has at least two upwardly projecting protuberances 401, 402 spaced apart from one another along the longitudinal direction of the slide 3, coming into the cavity formed by the upper curved wing 31, and configured to bear, directly or indirectly, against the lower face of the upper curved wing under the action of the anchorage device 2 fixed to the body 40, during an impact.

These two protuberances 401, 402 are positioned along the longitudinal direction of the slide, one on either side of the attachment point of the anchorage device, which may take the form of a tubular attachment part 403.

In FIG. 12, it can be seen that these two protuberances 401, 402 are massive, so as to take up the stresses resulting from force Fc.

The first set of teeth 6 on the section piece may be made, in the longitudinal direction of the slide, at the end of the upper curved wing 31. The first set of teeth 6 may be provided as an element attached to the section piece forming the slide, or, as illustrated, as one piece with the section piece forming the slide 3. The first set of teeth 6 may be obtained by cutting into the edge of the upper curved wing 31.

The teeth forming the first set of teeth 6 and second set of teeth 7 may be of complementary shapes, and in particular of triangular shape. One will note that the triangular shape of the teeth can be asymmetric: one will note that the angle α1 of the triangular profile of the teeth at the vertex of the triangle of the tooth pointing towards the front AV of the seating portion can be greater than the angle α2 at the vertex of the triangle pointing towards the rear AR of the seating portion: a locking of the body 40 of the slider system in the locking position P1 is obtained that is more resistant when the anchorage device 2 is forced towards the front of the seating portion, as encountered in the event of an impact by the action of the seat belt, in particular its lap portion of the seat belt strap, than when the anchorage device is forced towards the rear Ar of the seating portion.

According to one embodiment, the body 40 of the slider system 4 may comprise a groove 400, preferably oriented transversely to the slide, for example perpendicular to the longitudinal direction, and receiving the locking member 41 in the sliding clearance. This groove 400 is configured to guide the locking member 41 in its translational movement from the locking position P1 to the unlocked position P2, and vice versa.

The groove 400 extends transversely to the longitudinal direction of the slide and may be of depth that is less than its width.

The locking member 41 may be a flat element, plastic or metal, of a thickness equal or even slightly less than the depth of the groove 400. The locking member 41 is of a width substantially equal or slightly less than the width of the groove 400. The locking member has, in the direction of the groove, two straight edges 411, configured to cooperate respectively with the two edges of the groove 400 in guiding. The second set of teeth 7 is made on the upper edge of the flat element.

The cam 9, including the first ramp 90 and the second ramp 91, may be obtained by an opening such as a cutout in the general shape of an isosceles triangle whose main vertex of the isosceles triangle points downwards and the base of the isosceles triangle is oriented substantially along the longitudinal direction of the slide 6. In the neutral position $P_N$, the cam follower 8 is positioned at the main vertex of the isosceles triangle.

The first ramp 90 is formed by one of the two sides of same length of the isosceles triangle and the second ramp 91 is formed by the other of the two sides of same length of this isosceles triangle.

When the lug is moved by the nut 52 along the limited stroke, in one direction or the other, it comes into abutment against one or the other of the two vertices (other than the downward pointing main vertex of the isosceles triangle) which may have a rounded profile, complementary to the radius of curvature of the lug, and as can be seen in FIG. 6.

The locking member 41 may include an oblong hole 410 oriented in the direction of the groove 400, traversed by a tubular attachment part 403 projecting from the bottom of the groove 400, and to which the anchorage device 2 for the seat belt is attached. This oblong hole 410 allows the sliding of the tubular attachment part 403, possibly constituting an end-of-travel stop in one or the other of the two sliding directions of the locking member. The internal recess of the tubular attachment part 403 extends in the direction of the thickness of the body, in particular all the way through, and allows attaching the anchorage device According to one embodiment, the locking member 41 is held in the groove 400 of the body 40 by a cover element 10, covering the groove 400. The cover element 10 is for example clipped onto the body 40.

When the cover element 10 is removed, it allows the insertion or removal of the locking member 41 in the body 40 of the slider system 4. Once the locking member has been inserted into the groove 400, the attachment of the cover element 10 onto the body 40 allows the locking member 41 to be held captive in the groove 400 of the body, the locking member 41 then interposed between the groove 400 of the body 40 and the cover element 10.

The body 40 and the cover element 10 may be plastic elements, typically injection molded, and may have means enabling a clip-on attachment, such as two clips 16,17 protruding from a cover wall of the cover element 10, intended to engage with female parts 406, 407 receiving male portions of the clips 16, 17, in particular on both sides of the body 40 in the longitudinal direction of the slide.

When the body 40 of the slider system 4 comprises the tubular attachment part 403, of which the internal recess allows attachment of the anchorage device, the wall of the cover element 10 covering the locking member 41 comprises a window 18 allowing access to the internal recess of the tubular part 403; once the cover element 10 is fixed to the body 40, the attachment of the anchorage device 2 to the body 40 traverses this window.

FIG. 16 illustrates an example of attaching the anchorage device 2 to the body 40 of the slider system 4 by means of a screw. The screw Vs is inserted into an opening of the anchorage device 2, and has a threaded portion which cooperates with an internal thread of the tubular attachment part 403, as well as a head resting on the anchorage device 2. This screw also passes through the window 18 of the cover element 10. A spacer ring Be traversed by the screw is interposed between the anchorage device 2 and the cover element 10, bearing against these two elements.

According to one embodiment, the cover element 10 comprises two tabs 13, 14, in particular each with a bend, covering the two projecting protrusions 401, 402. The protrusions 401, 402 are then configured to come to bear, indirectly via the tabs, on the lower face of the upper curved wing 31 under the action of the anchorage device 2 fixed to the body, during an impact, under the action of force Fc.

The two tabs 13, 14 are then clamped between the lower face of the upper wing 31 and the two protuberances 401, 402 under the action of the anchorage device 2 during an impact, obtaining a firm hold of the cover element on the body.

Figure 3:
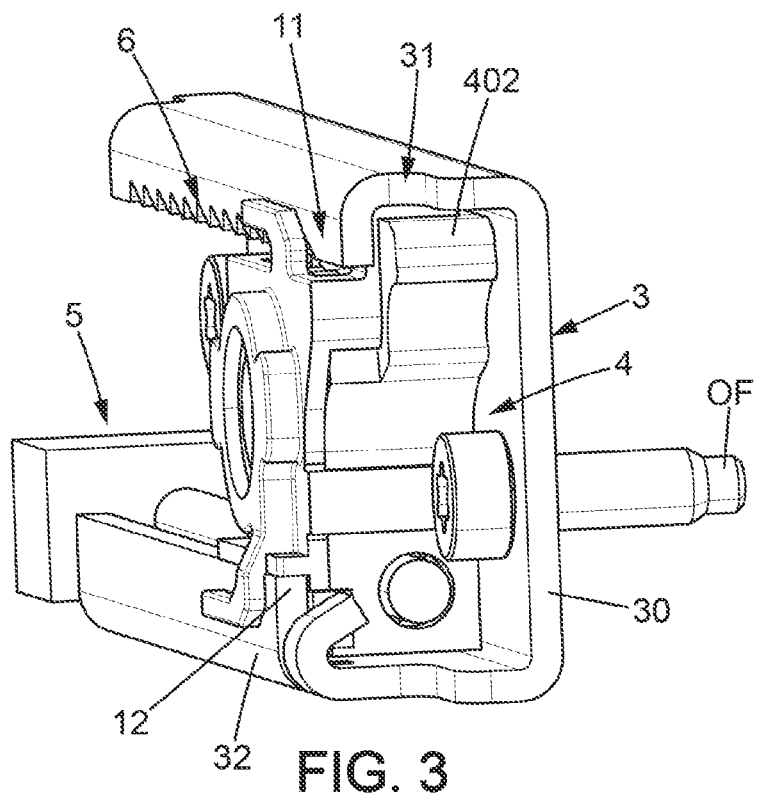
FIG. 3 is a side view of the movable anchorage system, showing the slider system in the slide.

According to one embodiment, the cover element 10 comprises an upper groove 11 directed in the longitudinal direction of the slide 3, receiving the free end of the upper curved wing 31, and/or a lower groove 12 directed in the longitudinal direction of the slide 3, receiving the free end of the lower curved wing 32, as can be seen in FIG. 3.

This upper groove 11 and lower groove 12 cooperate respectively with the free end of the upper curved wing 31 and of the lower curved wing 32 to facilitate guiding the cover element 10 along the slide 3.

One will also note that the cover element 10 may comprise a surface 19, in particular a projecting surface, extending laterally to the slider system 4, which cooperates with a stop 33, at one end of the slide. This stop 33 prevents the slider system from exiting the slide at this end. The stop 33, integral with the slide, may be obtained by a tongue that is one piece with the section piece, typically of metal.

The elastic member 42 may be a helical torsion spring, its turns surrounding the tubular attachment part 403, projecting from the bottom of the groove 400 of the body. The spring wire forming the turns is extended beyond the turns at two ends to form two hooks 420, 421. These hooks can be distributed one on either side of the tubular attachment part 403, along the longitudinal direction of the slide. These two hooks 420, 421 engage in notches of the locking member 41. In this example, the hooks 420, 421 are urged upwards by the torsion spring, in order to force the locking member 41 into the locking position P1.

It is also noted that the body 40 of the slider system 4 comprises two downwardly directed projecting parts 404, 405, staggered along the longitudinal direction of the slide, having bores for the passage of the screw 51 of the actuator.

The two projecting parts 404 405 leave a clearance between them for the nut 52, of excess dimension compared to the dimension of the nut along the axis of the screw. This excess clearance allows movement of the nut 52 relative to the body 40 along the limited stroke, relative to the neutral position $P_N$, in one direction or the other, to allow the passage of the locking member 40 from the locking position P1, in particular when the lug of the cam follower 8 integral with the nut 52 is in the neutral position $P_N$, to the unlocked position P2, in particular when the lug of the cam follower 8 cooperates with the first ramp 90 in a first direction of movement of the nut relative to the body, or with the second ramp 91 in a second direction of movement of the nut relative to the body.

It is also noted that during this movement caused by rotation of the screw, the nut 52 is prevented from pivoting about the axis of the screw, due to a surface 408 of the body extending in the longitudinal direction of the slide 3, which cooperates with a flat part of the nut 52.

According to one embodiment, the anchorage device 2 may incorporate a preloading device, also called a pretensioner, comprising a trigger device configured to detect an impact, and an actuator, such as a spring, a gas cartridge, or an explosive device, controlled by the trigger device, configured to force an anchorage point of the belt along a limited stroke.

This disclosure also relates to a vehicle seat comprising: a seating portion with: a seating portion assembly, having a front edge AV and a rear edge AR, comprising a seating portion frame CA and an anchorage frame CC for anchoring to the vehicle, which are interconnected, two anchorage devices 2 for the seat belt, the two anchorage devices 2 arranged one on either side of the seating portion assembly, configured to anchor the lap portion of the seat belt strap to a seating portion assembly, a seat belt strap comprising a lap portion connected to the seating portion by means of each of the two anchorage devices 2, a seat backrest hinged to pivot about a substantially transverse axis of the seating portion, at the rear edge of the seating portion assembly.

FIG. 1 illustrates a non-limiting example of a seating portion assembly including the seating portion frame which extends from the front edge AV to the rear edge AR in the X direction, and transversely in the Y direction.

This seating portion frame CA is connected to the anchorage frame CC in particular by means of connecting rods hinged along the Y direction, to allow the height of the seating portion frame to be adjusted relative to the anchorage frame CC in the Z direction.

A manually operated irreversible adjustment mechanism (not shown), or an irreversible motor (not shown), comprises an output pinion which meshes with a toothed sector in order to adjust the height of the seating portion. The anchorage frame CC itself may be movable in the X direction by means of the slide mechanism of the anchorage frame.

According to this disclosure, each anchorage device 2 is mounted to be movable relative to the seating portion assembly, by means of a movable anchorage system for seat belt according to this disclosure, in which the slide 3 is laterally attached to the seating portion frame CA. For example, one will note that the section piece of the slide 3 of each system is fixed to one of the two flanges of the seating portion frame CA.

The movable anchorage systems 1 are configured so that each of the anchorage devices 2 is able to be moved along the seating portion assembly, between the rear edge AR and the front edge AV of the seating portion assembly, by motorized movement of the slider system 4 along the slide, with the anchorage device 2 being locked by the passage of the locking member 41 into the locking position P1 at the end of the movement.

According to one embodiment, control means for controlling the actuators 5 of the two movable anchorage systems 1 for seat belt are configured to cause the sliding of each of the two anchorage devices 2 along the seating portion assembly automatically, the control means being configured to move each anchorage device 2, incorporated in the body 40 of the slider system 4, along the slide according to a change in the tilt of the backrest relative to the seating portion and/or according to a change in the tilt of the seating portion.

For this purpose, the control means are configured so that the pivoting of the backrest relative to the seating portion towards the rear of the seat causes, after the passage of the locking member 41 from the locking position P1 into the unlocked position P2, movement of the anchorage devices 2 along the seating portion assembly towards the front of the seat to a defined position, then the locking of the position by the passage of the locking member into the locking position P1.

The movable anchorage system is advantageous in that it allows adjustment of the position of the slider system 4 and of the anchorage device 2 incorporated in the system such that the lap portion of the seat belt strap is always positioned in proximity to the occupant's pelvis, and ideally at the pelvic bones, in particular regardless of the tilt adjustment of the seating portion and/or regardless of the tilt adjustment of the backrest.

Once the locking member 41 is again in its locking position P1, the position of the body 40 of the slider system 4, and of the anchorage device 2 incorporated in the latter, is advantageously locked in the longitudinal direction of the slide 3, in particular during a force Fc due to traction of the seat belt on the anchorage device in the event of an impact, and as illustrated in FIG. 2, which increases safety in the event of an impact.

The field of this disclosure is that of vehicle seats, in particular motor vehicle seats, and in particular anchorage systems for the seat belt strap, in particular the lap portion of the strap.

A seat with a seat belt may be used to hold a seat occupant firmly in the seat in the event of an impact or a sudden braking of the vehicle receiving the seat.

Such a seat belt may comprise a strap configured to be connected to the seat at a plurality of anchorage points on the seat by means of anchorage devices integral with the seat, so as to keep the occupant is retained in the seat. Once the belt strap has been received in the anchorage devices, a part of the strap, called the lap portion of the strap, extending between two anchorage devices integral with the seating portion of the seat and arranged one on either side of the seating portion, comes to bear against the seat occupant near the pelvis, while another portion of the strap, called the chest portion of the strap, extending between one of the anchorage devices integral with the seating portion of the seat and an anchorage element positioned high in the vehicle, for example at a door pillar or the seat backrest, comes to bear against the torso of the seat occupant.

Seats comprising a seating portion with a seating portion assembly comprising a seating portion frame and an anchorage frame for anchorage to the vehicle, the seating portion frame and the anchorage frame being interconnected may be used. Also, two anchorage devices for the lap portion of a seat belt strap are provided on the seating portion assembly, arranged one on either side of the seating portion assembly.

Each of these anchorage devices is arranged on the seating portion assembly in a position such that the lap portion of the seat belt strap, once received in the anchorage devices, is attached to the seating portion assembly at these anchorage devices, and so as to ensure that the seat occupant is retained in a normal position of use of the seat, by coming to bear against the occupant near the pelvis, and ideally at the pelvic bones which can withstand significant forces, which maximizes optimal support for the occupant on the seat, and in particular on the seating portion, in the event of an impact or a sudden braking of the vehicle receiving the seat, and with no risk of compressing other parts of his body.

A normal position of use of the seat corresponds to a position of the seat occupant in which he has his thighs and buttocks resting on the seating portion frame, and his back resting against the backrest of the seat, possibly also the back of his head resting against the headrest of the seat if the seat is fitted with a headrest connected to the backrest.

Also, the backrest of the seat is mounted to pivot relative to the seating portion about a substantially transverse axis of the seating portion, and the tilt of the backrest relative to the seating portion can be adjusted, in particular in order to allow the seat occupant to be in the desired position regardless of his morphology.

However, depending on the tilt of the backrest relative to the seating portion, it is possible for the seat occupant, in a normal position of use, to be positioned on the seating portion such that the lap portion of the belt strap, once received in the anchorage devices, is positioned at a distance from its pelvis and for example comes to bear against the abdominal area of the occupant. In such a case, the seat belt can no longer properly perform its role of maintaining the occupant on the seating portion in the event of an impact or a sudden braking of the vehicle, and the seat occupant could end up with his vertebrae or his internal organs crushed in the event of an impact or a sudden braking of the vehicle receiving the seat.

This present disclosure improves the situation.

A movable anchorage system for a seat belt, having a lockable slide mechanism comprises a slide extending in a longitudinal direction of adjustment of the position of the anchorage device for the seat belt, a slider system comprising at least one body configured to move in translation along the slide while being guided by the slide, the body incorporating an anchorage device for the seat belt, an actuator configured to ensure the movement of the slider system along the slide, comprising an electric motor and a screw/nut system including a screw, extending in the longitudinal direction of the slide, driven in rotation by the electric motor, and a nut configured to drive the slider system when caused to move by the screw during its rotation, a mechanism for locking the position of the slider system in the slide, comprising: a first set of teeth integral with the slide, extending in the longitudinal direction of the slide, a second set of teeth integral with a locking member of the slider system, the locking member configured to be movable relative to the body of the slider system from a locking position in which the second set of teeth is engaged with the first set of teeth, locking the movement of the slider system in the slide, and to an unlocked position in which the second set of teeth escapes the first set of teeth, freeing the slider system to slide in the slide, and a cam/cam follower system between the locking member and the nut, configured, when the nut is moved along the slide in a limited stroke, to move the locking member relative to the body from the locking position to the unlocked position by the work performed by the cam follower along the cam, before driving the body of the slider system integral with the anchorage device.

The features set forth in the following paragraphs may optionally be implemented. They may be implemented independently of one another or in combination with one another:

According to one embodiment, the cam comprises, from a neutral position of the cam follower relative to the cam allowing the passage of the locking member into the locking position, at least one ramp configured to cooperate with the cam follower in order to force the locking member into the unlocked position when the nut is actuated by the screw and electric motor in at least one direction of movement along the slide.

For example, the at least one ramp comprises a first ramp and a second ramp. Thus, and according to one embodiment, the cam comprises, along the longitudinal direction of the slide, one on either side of the neutral position of the cam follower with respect to the cam allowing the locking member to enter the locking position: the first ramp extending from the neutral position, configured to cooperate with the cam follower to force the locking member into the unlocked position when the nut is actuated by the screw and electric motor in a first direction of movement along the slide, the second ramp extending from the neutral position, configured to cooperate with the cam follower to force the locking member into the unlocked position when the nut is actuated by the screw and electric motor in a second direction of movement.

According to one embodiment, an elastic member is provided between the locking member and the body of the slider system, elastically forcing the locking member from the unlocked position to the locking position.

According to an advantageous embodiment, the cam/cam follower system is configured, in the unlocked position of the locking member, to break in the event of a force between the cam and cam follower that exceeds a threshold, resulting from the action of the anchorage device during an impact, so as to ensure the passage of the locking member into its locking position after breakage of the cam/cam follower system. The threshold may preferably be between about 200 N and about 400 N, for example about 300 N (Newtons).

According to one embodiment, the slide is a section piece extending in the longitudinal direction, the cross-section of the section piece having an intermediate wing extended by two curved wings, upper and lower, directed towards one another, and the slider system is received in the cavity of the section piece, in the interspace between the two curved wings.

According to one embodiment, the body has at least two upwardly projecting protuberances, spaced apart from one another in the longitudinal direction of the slide, coming into a cavity formed by the upper curved wing, and configured to bear directly or indirectly on the lower face of the upper curved wing under the action of the anchorage device fixed to the body, during an impact.

According to one embodiment, the first set of teeth on the section piece is made, along the longitudinal direction of the slide, at the end of the upper curved wing.

According to one embodiment, the body comprises a groove, for example oriented transversely to the slide, in particular perpendicular to the longitudinal direction, receiving the locking member in the sliding clearance and configured to guide the locking member in its translational movement from the locking position to the unlocked position, and vice versa.

According to one embodiment, the locking member is held in the groove of the body by a cover element coming to cover the groove, the cover element being in particular clipped onto the body.

According to one embodiment, the cover element comprises an upper groove directed in the longitudinal direction of the slide, receiving the free end of the upper curved wing, and/or a lower groove directed in the longitudinal direction of the slide, receiving the free end of the lower curved wing.

According to one embodiment, the locking member comprises an oblong hole oriented in the direction of the groove, traversed by a tubular attachment part projecting from the bottom of the groove, and to which the anchorage device for the seat belt is fixed.

According to one embodiment, the cover element comprises two tabs covering the two projecting protuberances of the body, the protuberances being configured to bear, indirectly, against the lower face of the upper curved wing under the action of the anchorage device fixed to the body, during an impact, the two tabs then clamped between the lower face of the upper curved wing and the two protuberances under the action of the anchorage device during an impact.

According to one embodiment, the elastic member is a helical torsion spring in which the turns surround the tubular attachment part.

According to one embodiment, the body of the slider system comprises two downwardly directed projecting parts, staggered along the longitudinal direction of the slide, having coaxial bores for the passage of the screw, the two projecting parts leaving a clearance between them for the nut, of excess dimension compared to the dimension of the nut along the axis of the screw, enabling movement of the nut relative to the body along the limited stroke, in one direction or in the other, to allow the passage of the locking member from the locking position to the unlocked position, and in which the nut is prevented from pivoting about the axis of the screw during this movement caused by rotation of the screw, due to a surface of the body, which cooperates with a flat part of the nut.

According to one embodiment, the cam follower is a projecting stud integral with the nut, the cam being integral with the locking member.

According to one embodiment, the anchorage device for the seat belt incorporates a preloading device comprising a trigger device configured to detect an impact, and an actuator such as a spring, a gas cartridge, or an explosive device, controlled by the trigger device, configured to force an anchorage point of the belt along a limited stroke.

According to a second aspect, this disclosure also relates to a vehicle seat comprising: a seating portion with: a seating portion assembly, having a front edge and a rear edge, comprising a seating portion frame and an anchorage frame for anchoring to the vehicle, which are interconnected, two anchorage devices for the seat belt, the two anchorage devices arranged one on either side of the seating portion assembly, configured to anchor the lap portion of the seat belt strap to a seating portion assembly, a seat belt strap comprising a lap portion connected to the seating portion by means of each of the two anchorage devices, a seat backrest hinged to pivot about a substantially transverse axis of the seating portion, at the rear edge of the seating portion assembly, and wherein each anchorage device for the seat belt is mounted to be movable relative to the seating portion assembly, by means of a movable anchorage system for seat belt according to this disclosure in which the slide is laterally attached to the seating portion frame, the movable anchorage systems being configured so that each of the anchorage devices is able to be moved along the seating portion assembly between the rear edge and the front edge of the seating portion assembly, with the position of the anchorage device being locked by the passage of the locking member into the locking position at the end of the movement.

According to one embodiment, the seat comprises control means for controlling the actuators of the two movable anchorage systems for seat belt, configured to cause the sliding of each of the two anchorage devices along the seating portion assembly automatically, the control means being configured to move each anchorage device, incorporated in the body of the slider system, along the slide according to a change in the tilt of the backrest relative to the seating portion and/or a change in the tilt of the seating portion, and the control means are configured so that the pivoting of the backrest relative to the seating portion towards the rear of the seat causes, after the passage of the locking member into the unlocked position, movement of the anchorage devices along the seating portion assembly towards the front of the seat to a defined position, then the locking of the position by the passage of the locking member into the locking position.

Movable anchorage system (1) for a seat belt, having a lockable slide mechanism comprising a slide (3) extending in a longitudinal direction of adjustment, a slider system (4) comprising at least one body (40) configured to move in translation along the slide (3) while being guided by the slide (3), the body incorporating an anchorage device for the seat belt, an actuator configured to ensure the movement of the slider system along the slide (3), a mechanism for locking the position of the slider system in the slide.

The following numbered clauses include embodiments that are contemplated and non-limiting:

Clause 1. A movable anchorage system (1) for a seat belt, having a lockable slide mechanism comprising a slide (3) extending in a longitudinal direction of adjustment of the position of the anchorage device for the seat belt, a slider system (4) comprising at least one body (40) configured to move in translation along the slide (3) while being guided by the slide (3), the body incorporating an anchorage device (2) for the seat belt, an actuator (5) configured to ensure the movement of the slider system along the slide (3), comprising an electric motor (50) and a screw/nut system including a screw (51), extending along the longitudinal direction of the slide (3), driven to rotate by the electric motor, and a nut (52) configured to drive the slider system when caused to move by the screw during its rotation, a mechanism for locking the position of the slider system in the slide, comprising:

a first set of teeth (6) integral with the slide, extending in the longitudinal direction of the slide, a second set of teeth (7) integral with a locking member (41) of the slider system (4), the locking member (41) being movable relative to the body (40) of the slider system (4) from a locking position (P1) in which the second set of teeth is engaged with the first set of teeth, locking the movement of the slider system (4) in the slide (3), and to an unlocked position (P2) in which the second set of teeth (7) escapes the first set of teeth (6), freeing the slider system (4) to slide in the slide (3), and a cam/cam follower system between the locking member (41) and the nut (52), configured, when the nut (52) is moved in a limited stroke along the slide (3), to move the locking member (41) relative to the body from the locking position (P1) to the unlocked position (P2) by means of the work performed by the cam follower (8) along the cam (9), before driving the body (40) of the slider system incorporating the anchorage device (2) along the slide (3).

Clause 2. The movable anchorage system (1) according to clause 1, wherein the cam (9) comprises, from a neutral position ($P_N$) of the cam follower (8) relative to the cam (9) allowing the passage of the locking member (41) into the locking position (P1), at least one ramp (90; 91) configured to cooperate with the cam follower (8) in order to force the locking member (41) into the unlocked position (P2) when the nut (52) is actuated by the screw and electric motor in at least one direction of movement along the slide (3).

Clause 3. The movable anchorage system (1) according to clause 2, wherein the cam (9) comprises, along the longitudinal direction of the slide, one on either side of the neutral position ($P_N$) of the cam follower (8) with respect to the cam (9) allowing passage of the locking member (41) into the locking position (P1):

a first ramp (90) extending from the neutral position, configured to cooperate with the cam follower (8) to force the locking member (41) into the unlocked position (P2) when the nut (52) is actuated by the screw and electric motor in a first direction of movement along the slide (3), a second ramp (91) extending from the neutral position, configured to cooperate with the cam follower (8) to force the locking member (41) into the unlocked position (P2) when the nut (52) is actuated by the screw and electric motor in a second direction of movement.

Clause 4. The movable anchorage system (1) according to one of clauses 1 to 3, wherein an elastic member (42), provided between the locking member (41) and the body (40) of the slider system, elastically forces the locking member (41) from the unlocked position (P2) to the locking position (P1).

Clause 5. The movable anchorage system (1) according to clause 4, wherein the cam/cam follower system is configured, in the unlocked position (P2) of the locking member (41), to break in the event of a force between the cam and cam follower that exceeds a threshold, preferably between about 200 N and about 400 N, resulting from the action of the anchorage device during an impact, so as to ensure the passage of the locking member (41) into its locking position (P1) after breakage of the cam/cam follower system.

Clause 6. The movable anchorage system (1) according to one of clauses 1 to 5; wherein the slide (3) is a section piece extending in the longitudinal direction, the cross-section of the section piece having an intermediate wing (30) extended by two curved wings (31,32), upper and lower, directed towards one another, and wherein the slider system (4) is received in the cavity of the section piece, in the interspace between the two curved wings (31,32).

Clause 7. The movable anchorage system (1) according to clause 6, wherein the body (40) has at least two upwardly projecting protuberances (401, 402), spaced apart from one another in the longitudinal direction of the slide (3), coming into a cavity formed by the upper (31) curved wing (31), and configured to bear directly or indirectly against the lower face of the upper curved wing (31) under the action of the anchorage device (2) fixed to the body (40), during an impact.

Clause 8. The movable anchorage system (1) according to clause 6 or 7, wherein the first set of teeth (6) on the section piece is made, along the longitudinal direction of the slide, at the end of the upper curved wing (31).

Clause 9. The movable anchorage system (1) according to one of clauses 1 to 8, wherein the body (40) comprises a groove (400) receiving the locking member (41) in the sliding clearance, the groove being configured to guide the locking member (41) in its translational movement from the locking position (P1) to the unlocked position (P2), and vice versa.

Clause 10. The movable anchorage system (1) according to clause 9, wherein the locking member (41) is held in the groove (400) of the body (40) by a cover element (10) coming to cover the groove (400), which can be clipped onto the body (40).

Clause 11. The movable anchorage system (1) according to clauses 6 and 10, wherein the cover element (10) comprises an upper groove (11) directed in the longitudinal direction of the slide (3), receiving the free end of the upper curved wing (31), and/or a lower groove (12) directed in the longitudinal direction of the slide (3), receiving the free end of the lower curved wing (32).

Clause 12. The movable anchorage system (1) according to one of clauses 9 to 11, wherein the locking member (41) comprises an oblong hole (410) oriented in the direction of the groove (400), traversed by a tubular attachment part (403) projecting from the bottom of the groove (400), and to which the anchorage device for the seat belt (2) is fixed.

Clause 13. The movable anchorage system (1) according to clauses 7 and 10, wherein the cover element (10) comprises two tabs (13, 14) covering the two projecting protuberances (401, 402), configured to bear, indirectly, against the lower face of the upper curved wing (31) under the action of the anchorage device fixed to the body, during an impact, the two tabs (13,14) then clamped between the lower face of the upper curved wing (31) and the two protuberances (401, 402) under the action of the anchorage device (2) during an impact.

Clause 14. The movable anchorage system (1) according to clauses 4 and 12, wherein the elastic member (42) is a helical torsion spring in which the turns surround the tubular attachment part (403).

Clause 15. The movable anchorage system (1) according to one of clauses 1 to 14, wherein the body (40) of the slider system (4) comprises two downwardly directed projecting parts (404, 405), staggered along the longitudinal direction of the slide (3), having coaxial bores for the passage of the screw (51), the two projecting parts leaving a clearance between them for the nut (52), of excess dimension compared to the dimension of the nut along the axis of the screw, enabling movement of the nut (52) relative to the body (40) along the limited stroke, in one direction or the other, to allow the passage of the locking member (41) from the locking position (P1) to the unlocked position (P2), and wherein the nut (52) is prevented from pivoting about the axis of the screw (51) during this movement caused by rotation of the screw, due to a surface (408) of the body, which cooperates with a flat part of the nut (52).

Clause 16. The movable anchorage system (1) according to one of clauses 1 to 15, wherein the cam follower (8) is a projecting stud integral with the nut (52), the cam being integral with the locking member (41).

Clause 17. The movable anchorage system (1) according to one of clauses 1 to 16, wherein the anchorage device for the seat belt (2) incorporates a preloading device comprising a trigger device configured to detect an impact, and an actuator such as a spring, a gas cartridge, or an explosive device, controlled by the trigger device, configured to force an anchorage point of the belt along a limited stroke.

Clause 18. A vehicle seat comprising:
a seating portion with:
a seating portion assembly, having a front edge (AV) and a rear edge (AR), comprising a seating portion frame (CA) and an anchorage frame (CC) for anchorage to the vehicle, which are interconnected,
two anchorage devices (2) for the seat belt, the two anchorage devices arranged one on either side of the seating portion assembly, configured to anchor the lap portion of the seat belt strap to a seating portion assembly,
a seat belt strap comprising a lap portion connected to the seating portion by means of each of the two anchorage devices (2),
a seat backrest hinged to pivot about a substantially transverse axis of the seating portion, at the rear edge of the seating portion assembly, and
wherein each anchorage device (2) for the seat belt is mounted to be movable relative to the seating portion assembly, by means of a movable anchorage system (1) for the seat belt according to one of claims 1 to 17 in which the slide (3) is laterally attached to the seating portion frame (CA), the movable anchorage systems (1) being configured so that each of the anchorage devices (2) is able to be moved along the seating portion assembly (10) between the rear edge (AR) and the front edge (AV) of the seating portion assembly, with the position of the anchorage device (2) being locked by the passage of the locking member (41) into the locking position (P1) at the end of movement.

Clause 19. The seat according to clause 18, comprising control means for controlling the actuators (5) of the two movable anchorage systems (1) for the seat belt that are configured to cause the sliding of each of the two anchorage devices (2) along the seating portion assembly automatically, the control means being configured to move each anchorage device (2), incorporated in the body (40) of the slider system (4), along the slide according to a change in the tilt of the backrest relative to the seating portion and/or according to a change in the tilt of the seating portion, and wherein the control means are configured so that the pivoting of the backrest relative to the seating portion towards the rear of the seat causes, after the passage of the locking member (41) into the unlocked position (P2), movement of the anchorage devices (2) along the seating portion assembly towards the front of the seat to a defined position, then the locking of the position by the passage of the locking member into the locking position (P1).

The invention claimed is:

1. A movable anchorage system for a seat belt, having a lockable slide mechanism comprising
a slide extending in a longitudinal direction of adjustment of a position of an anchorage device for the seat belt,
a slider system comprising at least one body configured to move in translation along the slide while being guided by the slide, the at least one body incorporating the anchorage device for the seat belt,
an actuator configured to ensure a movement of the slider system along the slide, comprising an electric motor and a screw/nut system including a screw, extending along the longitudinal direction of the slide, driven to rotate by the electric motor, and a nut configured to drive the slider system when caused to move by the screw during its rotation,
a mechanism for locking the position of the slider system in the slide, comprising:
a first set of teeth integral with the slide, extending in the longitudinal direction of the slide,
a second set of teeth integral with a locking member of the slider system, the locking member being movable relative to the body of the slider system from a locking position in which the second set of teeth is engaged with the first set of teeth, locking the movement of the slider system in the slide, and to an unlocked position in which the second set of teeth escapes the first set of teeth, freeing the slider system to slide in the slide, and
a cam/cam follower system, including a cam and a cam follower, between the locking member and the nut, configured, when the nut is moved in a limited stroke along the slide, to move the locking member relative to the body from the locking position to the unlocked position by means of the work performed by the cam follower along the cam, before driving the body of the slider system incorporating the anchorage device along the slide.

2. The movable anchorage system of claim 1, wherein the cam comprises, from a neutral position of the cam follower relative to the cam allowing passage of the locking member into the locking position, at least one ramp configured to cooperate with the cam follower in order to force the locking member into the unlocked position when the nut is actuated by the screw and electric motor in at least one direction of the movement along the slide.

3. The movable anchorage system of claim 2, wherein the cam comprises, along the longitudinal direction of the slide, one on either side of the neutral position of the cam follower with respect to the cam allowing passage of the locking member into the locking position:
a first ramp extending from the neutral position, configured to cooperate with the cam follower to force the locking member into the unlocked position when the nut is actuated by the screw and electric motor in a first direction of the movement along the slide,
a second ramp extending from the neutral position, configured to cooperate with the cam follower to force the locking member into the unlocked position when the nut is actuated by the screw and electric motor in a second direction of the movement.

4. The movable anchorage system of claim 1, wherein an elastic member, provided between the locking member and the body of the slider system, elastically forces the locking member from the unlocked position to the locking position.

5. The movable anchorage system of claim 4, wherein the elastic member is a helical torsion spring which surrounds a tubular attachment part.

6. The movable anchorage system of claim 4, wherein the cam/cam follower system is configured, in the unlocked position of the locking member, to break in an event of a force between the cam and cam follower that exceeds a threshold resulting from an action of the anchorage device during an impact, so as to ensure passage of the locking member into the locking position after breakage of the cam/cam follower system.

7. The movable anchorage system of claim 6, wherein the threshold is between 200 N and 400 N.

8. The movable anchorage system of claim 1, wherein the slide is a section piece extending in the longitudinal direction, the cross-section of the section piece having an intermediate wing extended by two curved wings, including an upper curved wing and a lower curved wing, directed towards one another, and wherein the slider system is received in the cavity of the section piece in an interspace between the two curved wings.

9. The movable anchorage system of claim 8, wherein the first set of teeth are on the section piece, along the longitudinal direction of the slide, at an end of the upper curved wing.

10. The movable anchorage system of claim 8, wherein the body has at least two upwardly projecting protuberances spaced apart from one another in the longitudinal direction of the slide extending into a cavity formed by the upper curved wing and configured to bear directly or indirectly against a lower face of the upper curved wing under an action of the anchorage device fixed to the body during an impact.

11. The movable anchorage system of claim 10, wherein the body comprises a groove receiving the locking member in the sliding clearance, the groove being configured to guide the locking member in translational movement from the locking position to the unlocked position, and vice versa, and wherein the locking member is held in the groove of the body by a cover element coming to cover the groove, which can be clipped onto the body, and wherein the cover element comprises two tabs covering the two projecting protuberances, configured to bear, indirectly, against the lower face of the upper curved wing under the action of the anchorage device fixed to the body, during an impact, the two tabs then clamped between the lower face of the upper curved wing and the two protuberances under the action of the anchorage device during an impact.

12. The movable anchorage system of claim 8, wherein the body comprises a groove receiving the locking member in a sliding clearance, the groove being configured to guide the locking member in translational movement from the locking position to the unlocked position, and vice versa.

13. The movable anchorage system of claim 12, wherein the locking member comprises an oblong hole oriented in the direction of the groove, traversed by a tubular attachment part projecting from the bottom of the groove, and to which the anchorage device for the seat belt is fixed.

14. The movable anchorage system of claim 12, wherein the locking member is held in the groove of the body by a cover element that covers the groove, which can be clipped onto the body.

15. The movable anchorage system of claim 14, wherein the cover element comprises an upper groove directed in the longitudinal direction of the slide, receiving a free end of the upper curved wing, and/or a lower groove directed in the longitudinal direction of the slide, receiving a free end of the lower curved wing.

16. The movable anchorage system of claim 1, wherein the body of the slider system comprises two downwardly directed projecting parts, staggered along the longitudinal direction of the slide, having coaxial bores for the passage of the screw, the two projecting parts leaving a clearance between them for the nut, of excess dimension compared to the dimension of the nut along the axis of the screw, enabling movement of the nut relative to the body along the limited stroke, in one direction or the other, to allow the passage of the locking member from the locking position to the unlocked position, and wherein the nut is blocked from pivoting about the axis of the screw during this movement caused by rotation of the screw, due to a surface of the body, which cooperates with a flat part of the nut.

17. The movable anchorage system of claim 1, wherein the cam follower is a projecting stud integral with the nut, the cam being integral with the locking member.

18. The movable anchorage system of claim 1, wherein the anchorage device for the seat belt is configured to incorporate a preloading device comprising a trigger device configured to detect an impact, and an actuator chosen among a spring, a gas cartridge, or an explosive device, controlled by the trigger device, configured to force an anchorage point of the belt along the limited stroke.

19. A vehicle seat comprising:
a seating portion with:
a seating portion assembly, having a front edge and a rear edge,
comprising a seating portion frame and an anchorage frame for anchorage to the vehicle, which are interconnected,
two anchorage devices for the seat belt, the two anchorage devices arranged one on either side of the seating portion assembly, configured to anchor the lap portion of the seat belt strap to a seating portion assembly,
a seat belt strap comprising a lap portion connected to the seating portion by means of each of the two anchorage devices,
a seat backrest hinged to pivot about a substantially transverse axis of the seating portion, at the rear edge of the seating portion assembly, and
wherein each of the two anchorage devices for the seat belt is mounted to be movable relative to the seating portion assembly, by means of a movable anchorage system for the seat belt according to claim 1 in which the slide is laterally attached to the seating portion frame, the movable anchorage systems being configured so that each of the two anchorage devices is able to be moved along the seating portion assembly between the rear edge and the front edge of the seating portion assembly, with the position of each of the two anchorage devices being locked by the passage of the locking member into the locking position at the end of the movement.

20. The vehicle seat claim 19, further comprising control means for controlling the actuators of the two movable anchorage systems for the seat belt that are configured to cause sliding of each of the two anchorage devices along the seating portion assembly automatically, the control means being configured to move each anchorage device, incorporated in the body of the slider system, along the slide according to a change in tilt of the backrest relative to the seating portion and/or according to a change in tilt of the seating portion, and wherein the control means are configured so that pivoting of the backrest relative to the seating portion towards the rear of the seat causes, after the passage of the locking member into the unlocked position, the movement of the anchorage devices along the seating portion assembly towards the front of the seat to a defined position, then the locking of the position by the passage of the locking member into the locking position.

* * * * *